Aug. 27, 1940.　　　　C. T. PERKINS　　　　2,213,016
AIR CONDITIONING MEANS FOR AUTOMOBILES
Filed Oct. 16, 1937　　　6 Sheets-Sheet 2

Aug. 27, 1940.   C. T. PERKINS   2,213,016
AIR CONDITIONING MEANS FOR AUTOMOBILES
Filed Oct. 16, 1937   6 Sheets-Sheet 5

Inventor
Charles T. Perkins

Patented Aug. 27, 1940

2,213,016

UNITED STATES PATENT OFFICE 2,213,016

AIR CONDITIONING MEANS FOR AUTOMOBILES

Charles T. Perkins, Racine, Wis., assignor to Modine Manufacturing Company, Racine, Wis., a corporation of Wisconsin Application October 16, 1937, Serial No. 169,397

6 Claims. (Cl. 98—2)

This invention relates to air conditioning means for automobiles, and has as a general object to provide an air conditioner capable of supplying cleaned, fresh, conditioned air to the occupants of an automobile during all normal driving conditions.

Heretofore attempts to insure comfort for the occupants of an automobile have been confined to the provision of heating devices, and while many different kinds of heaters have been used with varying degrees of success, those employing hot water or steam as a heating medium have generally supplanted all other types. These hot water and steam heaters merely recirculate the air within the passenger compartment, and ineffectually meet but one requirement of winter air conditioning, i. e. they supply heat.

But the great temperature differential which exists in an automobile when such heaters are in operation, the scorching blasts blown onto the front seat non-driving passenger and the cold drafts at other places within the passenger compartment—in short, the utter lack of even a semblance of temperature uniformity to say nothing of the depletion of oxygen in the air and its consequent effect on the car occupants, and the clouding and frosting of windshield and windows, are glaring testimonials of the deficiencies of these heaters.

Comfort to the occupants of an automobile during cold weather cannot be attained unless ventilation is assured, and the air introduced into the passenger compartment is filtered. Also, the humidity of the air must be controlled, and the proper temperature uniformly maintained by adequate circulation.

The inability of past and existing automobile heaters to meet these prerequisites is obvious.

This invention, however, succeeds in meeting these requirements by providing an air conditioning apparatus which is so designed that it introduces cleaned, fresh, conditioned air from the outside atmosphere into the passenger compartment at comfortable temperatures and in a volume sufficient to maintain a pressure or plenum within the passenger compartment and thereby preclude drafts caused by infiltration of air through cracks at the doors and windows.

This invention further contemplates as one of its objects to provide an air conditioner for automobiles which will deliver clean, fresh, conditioned air at temperatures comfortable to the occupants of the vehicle in volume from 100 cubic feet per minute to 675 cubic feet per minute depending upon the speed of the car, to thereby insure the best of ventilation.

Another object of this invention is to provide in effect dehumidification to preclude the frosting of windshield and windows by maintaining a constant exfiltration of air through the cracks inevitably present at the doors and windows or through openings specially provided therefor, in sufficient volume to carry off any moisture which the air may hold or have imparted thereto before such moisture can accumulate on the windshield and windows.

Another object of this invention is to provide means for introducing fresh air into the automobile and for removing or trapping all precipitation in the form of rain, snow, and hail so that the admission of fresh air to the automobile is not dependent upon weather conditions.

Another object of this invention is to provide a simple efficient filter for filtering the air taken into the automobile, which is so constructed that it may be readily removed for replacement, repairs, or cleaning.

Another object of this invention is to provide means whereby the air passing through the heat exchanger may be taken either from the outside or recirculated from within the passenger compartment.

It is also an object of this invention to provide automatic controls to determine whether air is to be taken from the outside of the car or recirculated.

With a view toward providing cooling for summer air conditioning, this invention contemplates the provision of simple means for providing a refillable supply of a cooling medium.

Another object of this invention is to provide an improved air conditioning apparatus for automobiles which is so designed that it will fit in the space between the partition wall dividing the engine compartment from the passenger compartment and the instrument board panel so that the conventional cowl ventilator opening can be utilized for the introduction of fresh air thereto.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which.

Figure 1:
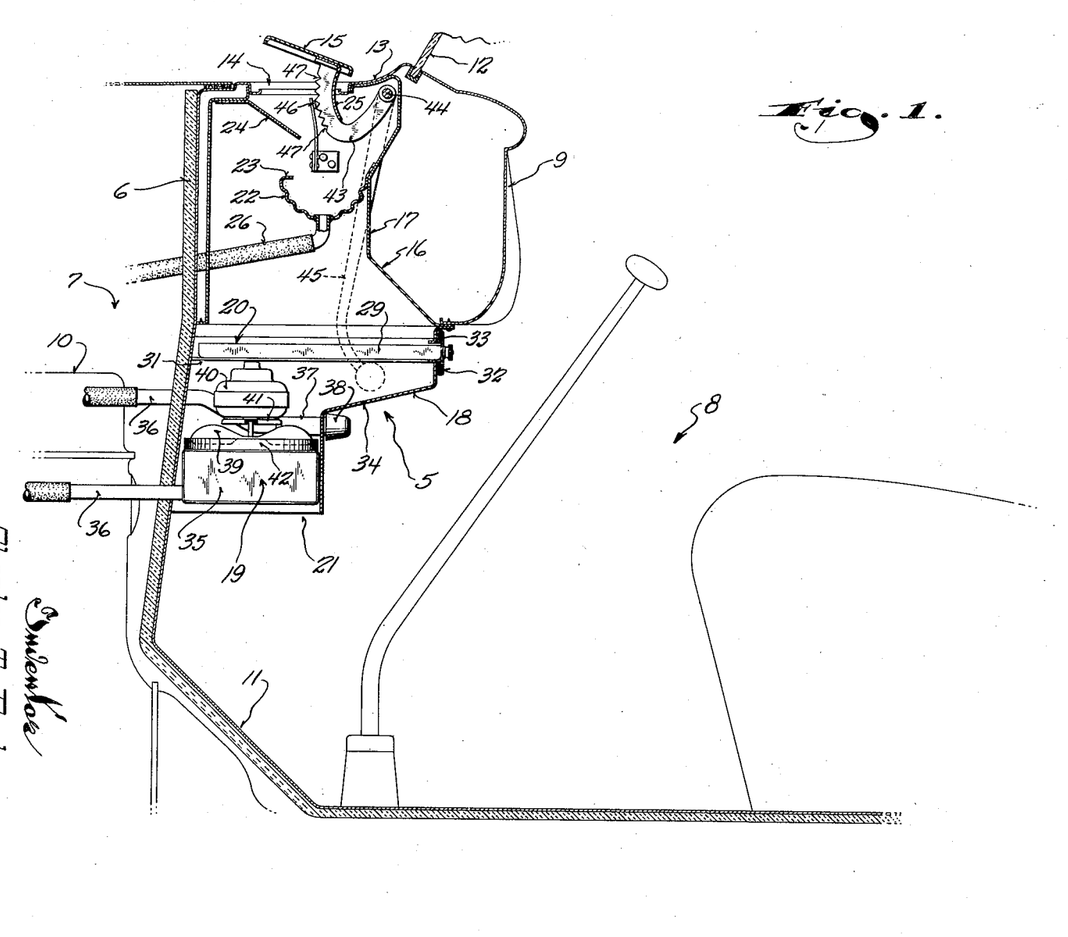
Figure 1 is a longitudinal sectional view through part of an automobile illustrating the application of this invention thereto.
Figure 2:
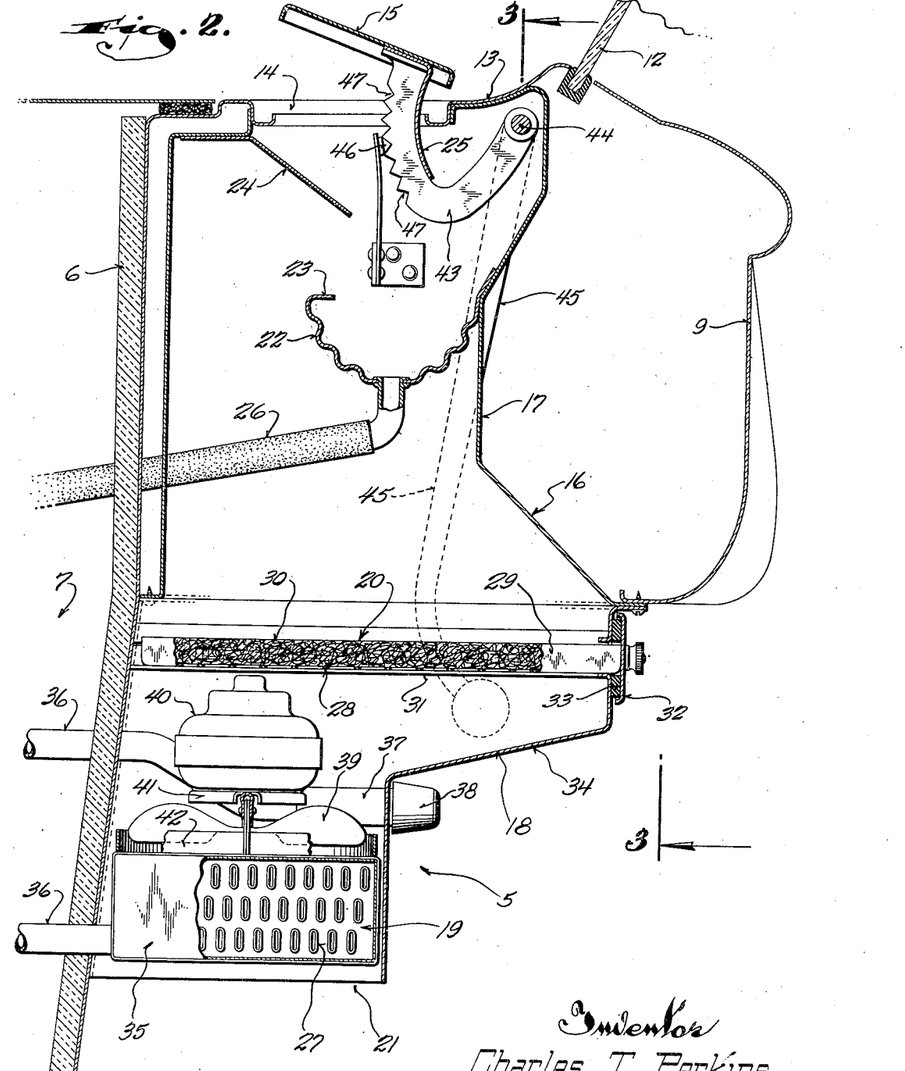
Figure 2 is an enlarged sectional view like Figure 1, but showing only the air conditioner per se.

Referring now particularly to the accompanying drawings in which like numerals indicate like parts, the numeral 5 indicates generally the complete air conditioning device of this invention. As shown, this unit is mounted between the partition wall 6 which divides the engine compartment 7 from the passenger compartment 8, and the instrument board panel 9. As is customary the partition wall 6 is located directly in back of the engine 10 and has its lower edge joined to the floor boards 11 of the passenger compartment. The partition wall 6 thus may be said to constitute the front wall of the passenger compartment.

The passenger compartment has the usual seats and is enclosed by doors and windows (not shown) with a windshield 12 extending up from the instrument board panel in the customary manner. That part of the automobile body 13 directly ahead of the windshield is known in the art as the cowl or cowling and, as has been customary in recent automobile designs, is provided with an opening 14 adapted to be closed by a door or cover 15. This opening and door or cover 15 form a part of the air conditioning apparatus of this invention, as will be hereinafter more fully described.

The air conditioning apparatus 5 comprises a box-like casing 16 mounted between the partition wall 6 and the instrument board panel 9 directly beneath the opening 14 so that the opening 14 leads to the interior of this casing to supply fresh outside air thereto. The upper end of the casing 16 is securely connected to the undersurface of the cowling so that the only admission of air into the casing is through the opening 14.

For convenience in manufacture the casing 16 is formed in two separable sections, an upper section 17 which extends from the cowling to a point substantially in line with the bottom of the instrument board and is preferably built directly into the automobile by the body manufacturer, and a lower section 18 which constitutes the housing for a heat exchanger 19 and a filter 20. This construction permits the lower section with the instrumentalities it contains to be manufactured independently of the automobile body.

The juncture between the sections is made air tight so that the two sections form one continuous duct leading from the opening 14 at its upper end to a discharge opening 21 provided by the open bottom of the lower section 18. The air which enters the opening 14 thus passes down through this casing or duct to issue from the discharge opening 21 for entrance to the passenger compartment.

Inasmuch as this invention contemplates the introduction of fresh air into the passenger compartment at all times regardless of inclemencies of weather, any precipitation which enters the opening 14 must be removed or trapped, and to this end a trough-like baffle plate 22 extends across the upper section of the casing 16 from side wall to side wall with one edge thereof fixed to the back wall of the casing and its other edge which is provided with an inturned flange 23, spaced from the front wall of the casing.

A second baffle 24 fixed to the undersurface of the cowling and a downwardly extending curved wall 25 carried by the door 15 cooperate to direct all air and any rain or snow entering the opening 14 down into the trough or trap formed by the baffle plate 22. Consequently, any precipitation carried through the opening 14 is trapped to be drained by a suitable drain pipe 26. Preferably the curved baffle plate 22 is corrugated as shown so as to more effectively remove rain and snow from the air as it passes thereover.

After the air has been relieved of any precipitation which may have entered the opening with it, it continues down through the duct or casing to pass through the filter 20 and subsequently through the heat exchanger 19.

The filter 20 extends horizontally across the entire area of the duct or casing so that all air entering the opening 14 and flowing down to the heat exchanger must pass through it. Hence, it will be seen that the filter, besides removing dust and dirt from the air, also serves as a diffuser to spread the air over the entire area of the heat exchanger core 27.

Figure 3:
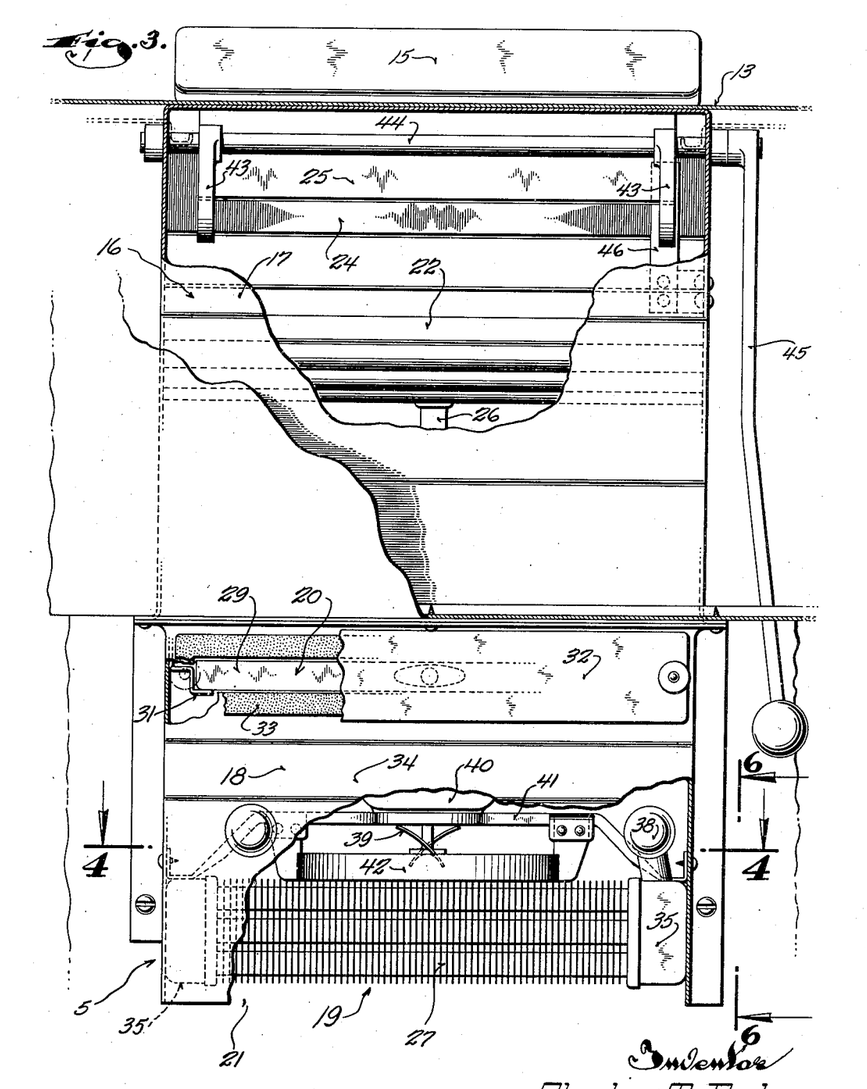
Figure 3 is a view in front elevation partly in section taken through Figure 2 on the plane of the line 3—3.
Figure 4:
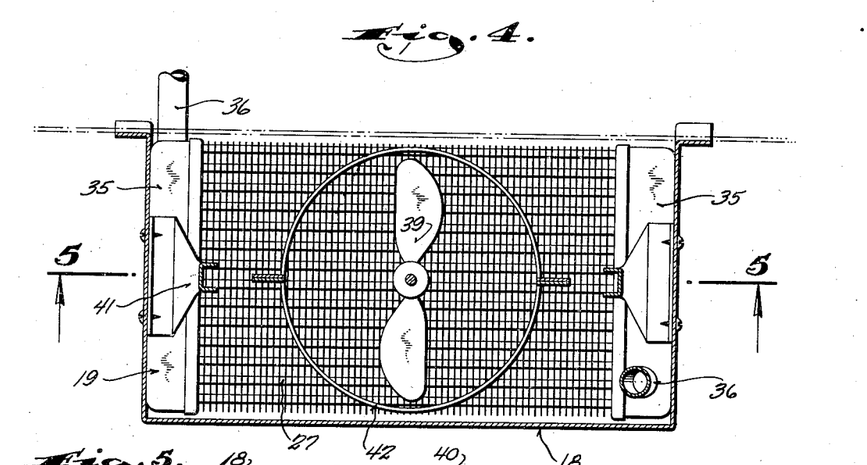
Figure 4 is a cross sectional view taken through Figure 3 on the plane of the line 4—4.

The filter 20 consists of a tray having a wire mesh bottom 28 joined to a suitable frame 29 and covered over with a layer of filtering material 30 of any suitable character. The tray is removably supported on slides 31 extended inwardly from the side walls of the housing 18, and is normally held in position by a cover plate 32 closing the opening through which the filter must be passed. The cover plate 32 is readily detachably secured in place and has a rubber gasket 33 to preclude leakage of air from the casing at this point.

Figure 7:
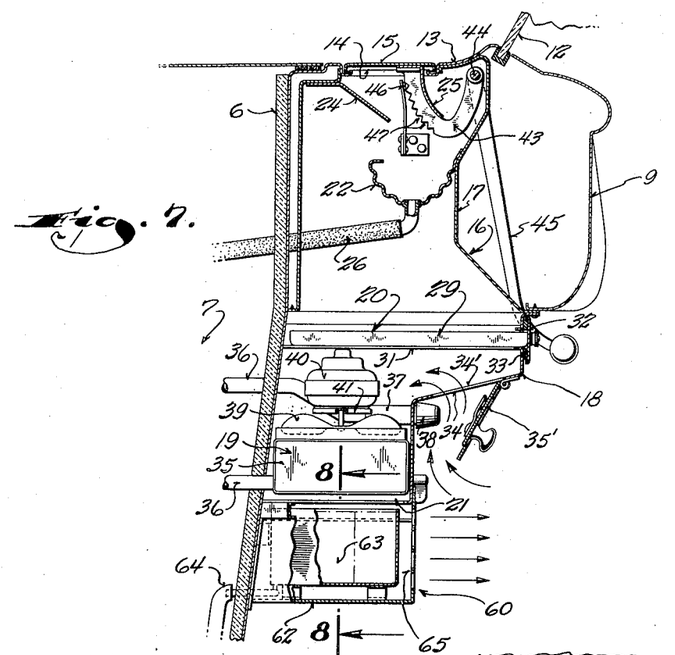
Figure 7 is a view similar to Figure 2, but showing a modification of the invention to adapt the same for summer conditioning.
Figure 9:
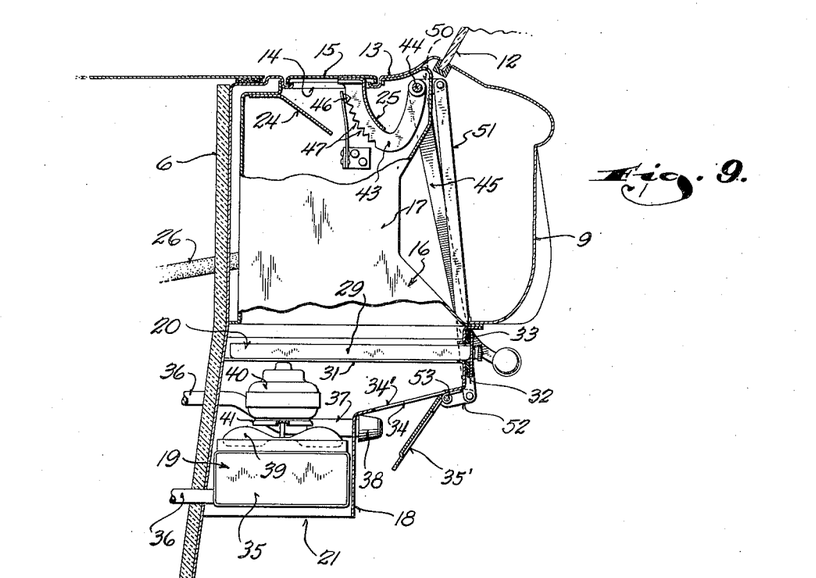
Figures 9 and 10 are views similar to Figure 2 illustrating other modified embodiments of the invention.
Figure 10:
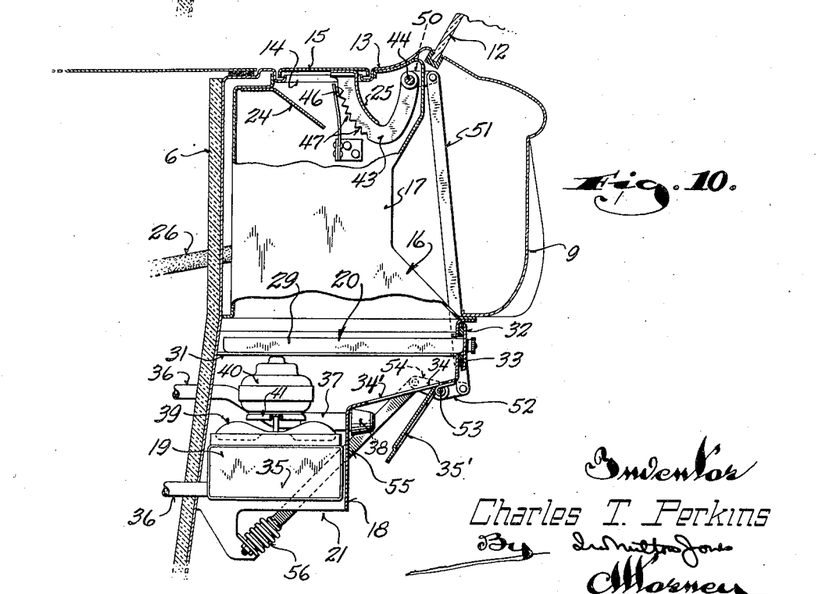

Directly beneath the filter, the housing 18 is preferably reduced in width which leaves a forwardly and downwardly inclined wall 34 in which a recirculation opening 34' may be formed as shown in the modified embodiments of the invention illustrated in Figures 7, 9, and 10. These constructions will be hereinafter more fully described. In the preferred embodiment of the invention the wall 34, however, is imperforate and merely serves to guide the air toward the heat exchanger after it has passed through the filter.

The heat exchanger comprises the core 27 which joins spaced header tanks 35 to which supply pipes 36 are connected to provide for the circulation of hot water from the engine cooling system or any other suitable heating medium through the core 27.

Figure 6:
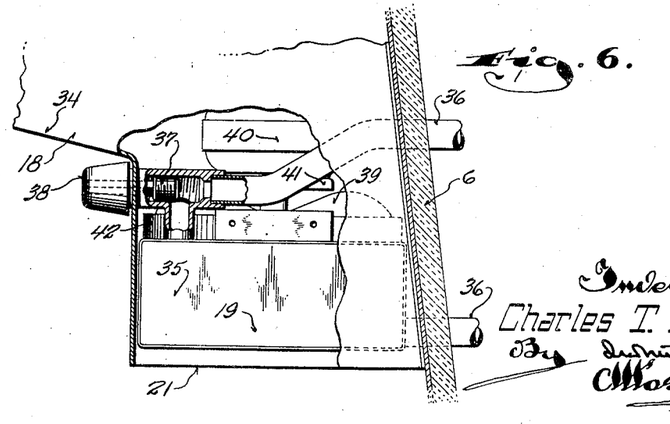
Figure 6 is a detail view taken on the plane of the line 6—6 of Figure 3 with parts broken away and in section illustrating particularly the control for the flow of heating fluid through the heat exchanger.

The supply pipe which conducts the hot water from the engine to the core has a valve 37 mounted therein, manually operable by a knob 38 which is readily accessible to an occupant of the automobile, for controlling the flow of hot water to the core and for entirely shutting off the supply when desired. (See Figure 6.)

Above the core 27 is an air impeller 39 driven by an electric motor 40. The impeller maintains a downward flow of air through the duct or casing past the filter and heat exchanger whenever the door 15 is open.

The air impeller and its motor are mounted on a transverse support 41 (see Figure 5) having its ends attached to the side walls of the housing 18, and suspended from this cross support is a shroud ring 42 encircling the impeller to increase its efficiency and concentrate the flow of air through a central portion of the core. With this construction it is possible to effect a recirculation of air within the passenger compartment by closing the door 15 to prevent the admission of fresh air from the outside.

Figure 5:
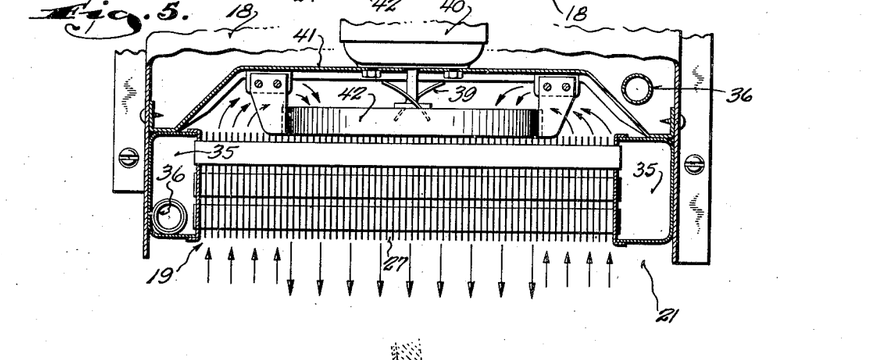
Figure 5 is a sectional view taken through Figure 4 on the plane of the line 5—5.

With the door 15 closed and the impeller in operation, air flows upwardly through that portion of the core 27 lying outside of the ring 42 and flows downwardly through that portion of the core encircled by the ring as clearly shown in Figure 5.

The door 15 which controls the admission of fresh air is mounted on two curved arms 43 fixed to a transverse rod 44 journalled in bearings carried by the side walls of the upper casing section 17. At one end the rod 44 has an actuating handle 45 secured thereto, which is manually operable to move the door from a closed position to a fully open position. A spring detent 46 engaging in notches 47 in one of the arms 43 serves to hold the door 15 in any desired position of adjustment.

The structure thus far described is intended solely for winter air conditioning which requires the heating of the air.

In operation it is preferable to keep the door 15 open an amount depending upon the speed of the car and also the outside temperature. In any event the door should be left open so that fresh air passes through the opening 14 and down to the filter 20. As pointed out hereinbefore, in passing through the filter 20, the air is not only cleaned but it is also diffused over the entire area of the heat exchanger core so that all portions thereof are given a uniform temperature. The adjustment of the valve 37 which controls the flow of heating fluid through the core of the heat exchanger is, of course, determined by the temperature of the outside air, and whether or not the impeller is to be in operation depends upon the speed of the car.

From actual tests it has been established that when the car is stationary and the impeller is in operation, fresh air can be drawn through the opening 14 and supplied to the occupants of the passenger compartment at a rate of 100 cubic feet per minute. Without the impeller and at a speed of 30 miles per hour, 250 cubic feet of air per minute can be introduced into the passenger compartment, and as the car speed increases the volume of air taken into the passenger compartment steps up proportionately until at a speed of 70 miles per hour, the air intake is 675 cubic feet per minute. All of this air, as it is taken into the passenger compartment, is cleaned and brought to a temperature comfortable to the occupants of the vehicle.

For the most satisfactory operation in cold weather, the water valve 37 should be left wide open and the desired control effected by opening and closing the door 15 to vary the amount of fresh air allowed to enter the vehicle.

When the outdoor temperature rises to the point where a combined wide open water valve and a wide open cowl ventilator supplies too much heat, or air that is too hot, then the water valve should be regulated until the desired temperature is attained.

In view of the large volume of air that can be taken into the conditioner from the outside, either by the fan when the car is stationary or by the deflector action of the door 15 when the automobile is in motion, there is at all times a condition of pressure within the passenger compartment. In other words, when in operation this invention maintains a plenum of fresh properly conditioned air within the passenger compartment. Consequently, there is a constant exfiltration from the passenger compartment through cracks at the doors and windows which precludes infiltration and entirely avoids objectionable cold drafts.

This condition also eliminates whistling noises which accompany infiltration and noises which would result from an inrush of wind through slightly opened windows.

Perfect circulation of air throughout the entire passenger compartment is thus assured, and from tests conducted on very windy days, it has been found that at reasonable car speeds a temperature difference of only three degrees exists between the space at the feet of the passengers in the front seat and the space at the feet of the passengers occupying the rear seat.

Inasmuch as there is a constant exfiltration of air from the passenger compartment at a rate high enough to carry out moisture before it has had a chance to settle, objectionable frosting or clouding of the windshield and windows is entirely avoided, even though all of the windows are tightly closed.

As noted hereinbefore, the forwardly downwardly slanting wall 34 of the lower casing section 18 may be provided with a recirculation opening 34' and in Figures 9 and 10 there is illustrated a positive interlinking of the door 15 which controls the admission of fresh air and the door 35' which closes the recirculation opening 34'. For this purpose the rod 44, upon which the door 15 is mounted, has a short lever arm 50 fastened thereto, the outer end of which is connected through a link 51 with a lever 52 fixed to a hinge pin 53 to which the door 35' is secured. The length of the link 51 and the disposition of the lever arms is such that when one door is fully closed, the other is fully open.

Figure 9 illustrates this construction as used with the manual control shown in the preferred embodiment, and Figure 10 illustrates its application to an automatic control. In this case another lever arm 54 is fixed to the hinge pin 53, the outer end of which is connected by means of a link 55 with a Sylphon 56 which is rigidly supported beneath the heat exchanger to be directly affected by the temperature of the air issuing therefrom.

When the air flowing through the heat exchanger is cold, the Sylphon remains contracted as shown in Figure 10 to keep the door 15 closed and the recirculation door 35' open, and as the temperature of the air issuing from the heat exchanger rises the Sylphon expands to gradually open the door 15 and close the recirculation door. In other respects the operation of the modification illustrated in Figures 9 and 10 is similar to that previously described.

Figure 8:
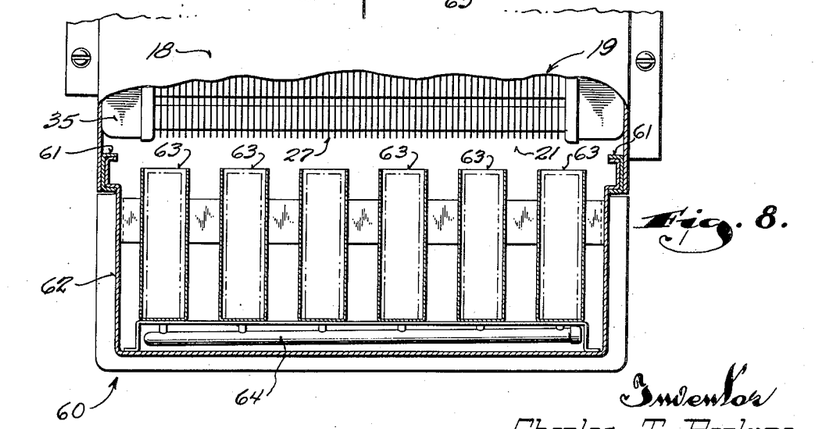
Figure 8 is an enlarged sectional view taken through Figure 7 on the plane of the line 8—8.

In Figures 7 and 8 one modification of this invention to adapt the same for summer air conditioning has been illustrated. This form of the invention is identical to that of the preferred embodiment, but in addition thereto an independently controlled recirculation door is provided, and a cooling unit indicated generally by the numeral 60 is attached to the lower discharge end 21 of the housing 18.

The cooling unit 60 is in the nature of a boot or box-like attachment which may be detachably secured in place by interengaging slides 61 on the side walls of the housing 18 and the box-like casing 62 of the cooling unit. With this construction the cooling unit may be slid to and from operative position.

Any suitable means for holding a refillable supply of a cooling medium may be mounted in the casing 62, and in the present embodiment a plurality of open top containers 63 are mounted therein, each of which is adapted to hold either a block of "dry ice" or ordinary ice. These containers drain into a common drain pipe 64 which carries off the meltage when ordinary ice is used.

The rear wall 65 of the casing is perforated as shown to provide an outlet for the air caused to flow over the cooling units by the impeller.

Obviously, when cooling is in effect, the valve 37 which controls the flow of heating fluid through the core is closed, and to exclude the warm outside air, the cowl ventilator door 15 must be closed.

From the foregoing description taken in connection with the accompanying drawings, it will be readily apparent to those skilled in the art that this invention provides an air conditioning apparatus for automobiles, capable of introducing clean, fresh air into the passenger compartment at a temperature comfortable to the occupants and in such volume as to insure many complete changes of air per minute, and that without the addition of any extraneous appliances and without special provision therefor, it eliminates frosting of the windshield and windows.

What I claim as my invention is:

1. In an automobile having a passenger compartment and an engine compartment separated by a dashboard and having an instrument board panel within the passenger compartment spaced from the dashboard, said space being closed at its top by the cowl of the automobile in which an air inlet opening is provided: a duct-like casing mounted in the space between the dashboard and the instrument board panel with its upper end having substantially an air tight connection with the undersurface of the cowl around the cowl opening, the walls of said casing being imperforate and the casing being open at its bottom; a second casing assembled to the bottom of the first named casing to form substantially a continuation thereof, said second casing having an opening in its wall adjacent to the instrument board panel; a filter positioned transversely across the second casing in line with said opening to be removable therethrough; and a heat exchanger positioned crosswise within the lower portion of said second casing through which air passing through the filter flows to gain access to the passenger compartment.

2. In a ventilating system for automobiles having a windshield and a cowl provided with an opening in its top wall in front of the windshield: a vertically disposed casing having at its upper end an inlet opening directly communicating with said opening in the cowl and a discharge opening at its lower end communicating with the interior of the body of the automobile; a filter unit comprising a filter plate having an overall cross sectional area substantially greater than the area of the inlet opening; and means above the filter plate including baffle means disposed between the air inlet opening and the filter plate for preventing the passage of water through the filter plate and a drainage trough into which water intercepted by the baffle means is collected to be drained to the exterior of the body, said filter plate being constructed and arranged to diffuse air and remove dust and dirt from the air passing therethrough.

3. In a ventilating system for automobiles having a windshield and a cowl provided with an opening in its top wall in front of the windshield: a vertically disposed casing having at its upper end an inlet opening directly communicating with said opening in the cowl and a discharge opening at its lower end communicating with the interior of the body of the automobile; a filter unit comprising a filter plate having an overall cross sectional area substantially greater than the area of either the inlet opening or the outlet opening; and means above the filter plate including a water collecting trough, baffle means disposed between the water collecting trough and the air inlet opening for preventing the passage of water through the filter plate and directing it to the water collecting trough and means for draining water from the trough, said filter plate being constructed and arranged to remove dust and dirt from the air passing therethrough.

4. In a ventilating system for automobiles having a windshield and a cowl provided with an opening in its top wall in front of the windshield: a casing having at its upper end an inlet opening directly communicating with said opening in the cowl and an outlet opening communicating with the interior of the body of the automobile; a filter unit between the inlet and outlet openings comprising a filter plate having an overall cross sectional area taken in a plane substantially perpendicular to the direction of the passage of air through the filter substantially greater than the area of either the inlet opening or the outlet opening; and means for removing water from the air entering through the inlet opening before said air passes through the filter comprising a drainage trough and a baffle for deflecting said water into the trough, and means for draining water from the trough to the exterior of the body of the automobile, said filter plate being constructed and arranged to remove dust and dirt from said air passing therethrough.

5. In an automobile having a passenger compartment and an engine compartment separated by a partition wall and having an instrument board panel within the passenger compartment spaced from said partition wall with an opening in an outside wall leading to said space: an imperforate walled duct mounted in said space between the partition wall and instrument board panel, the inlet end of said duct having substantially an air tight connection with said outside wall around the opening therein so that all air entering the opening must flow into the duct and the outlet end thereof being arranged to discharge into the passenger compartment; a heat exchanger having a core extending substantially across the duct so that all air flowing therethrough must flow through the heat exchanger core; a filter; means readily removably mounting the filter across said duct between its inlet end and the heat exchanger so that the air flowing through the duct is cleansed and diffused thereby over the heat exchanger core; baffle means in said duct between its inlet end and the filter for trapping precipitation which enters the duct; a drain for carrying off such trapped precipitation; controllable means for directing the air currents flowing across said outside wall as an incident to the forward motion of the automobile into the duct and through the filter and heat exchanger to enter the passenger compartment; and a fan in the duct for effecting a flow of air into the duct and through the filter and heat exchanger when the speed of the automobile is insufficient to effect the desired passage of air into the duct and through the filter and heat exchanger so that the introduction of fresh air in sufficient volume to maintain a plenum of air in the passenger compartment is assured at all speeds of the automobile and when the automobile is standing still.

6. In an automobile having a passenger compartment and having an air inlet opening in one of its exterior walls through which fresh air enters upon forward motion of the automobile: an imperforate walled duct having its inlet end so connected with said exterior wall that all the air entering the inlet opening must flow into the duct and having its outlet end positioned to discharge into the passenger compartment; a heat exchanger so positioned within the duct that all air flowing therethrough must pass through the heat exchanger; valve means for controlling the passage of air through the heat exchanger; a filter; means removably mounting the filter across the duct between its inlet end and the heat exchanger so that all the air flowing through the duct is cleansed and diffused by the filter over the heat exchanger core; baffle means in the duct between its inlet end and the filter for trapping precipitation which enters said opening; a drain for carrying off such trapped precipitation; and a fan in the duct for effecting a flow of air into the duct and through the filter and heat exchanger when the speed of the automobile is insufficient to effect the desired passage of air into the duct and through the filter and heat exchanger so that the introduction of fresh air in sufficient volume to maintain a plenum of air in the passenger compartment and preclude infiltration of air through cracks at the doors and windows is assured at all speeds of the automobile and when the automobile is standing still.

CHARLES T. PERKINS.